(12) United States Patent
Sakai et al.

(10) Patent No.: US 6,427,986 B1  
(45) Date of Patent: Aug. 6, 2002

(54) AIR SUSPENSION APPARATUS

(75) Inventors: Hiroshi Sakai, Tokyo; Akinori Kurusu; Nobuyuki Ichimaru, both of Kanagawa-ken; Takao Kohara; Satoshi Ohsawa, both of Tokyo, all of (JP)

(73) Assignee: Tokico, Ltd., Kanagawa-ken (JP)

( * ) Notice: Subject to any disclaimer, the term of this patent is extended or adjusted under 35 U.S.C. 154(b) by 0 days.

(21) Appl. No.: 09/538,531

(22) Filed: Mar. 30, 2000

(30) Foreign Application Priority Data

Mar. 31, 1999 (JP) .......................................... 11-092715

(51) Int. Cl.$^7$ ................................................. F16F 9/14
(52) U.S. Cl. ................................ 267/64.15; 267/64.28; 188/266.6; 188/281; 188/282.4; 188/299.1; 188/322.2
(58) Field of Search ........................... 267/64.15, 64.14, 267/64.21, 64.24, 64.28; 188/299.1, 322.2, 266.5, 266.6, 322.15, 322.19, 281, 282.4

(56) References Cited

U.S. PATENT DOCUMENTS

| | | | | |
|---|---|---|---|---|
| 4,720,085 A | * | 1/1988 | Shinbori et al. | 267/64.16 |
| 4,741,554 A | * | 5/1988 | Okamoto | 280/124.1 |
| 4,789,935 A | * | 12/1988 | Buma et al. | 280/124.1 X |
| 4,834,088 A | * | 5/1989 | Jeanson | 188/299.1 |
| 5,207,300 A | * | 5/1993 | Engel et al. | 188/299.1 |
| 5,934,421 A | * | 8/1999 | Nakadate et al. | 188/299.1 |
| 6,182,687 B1 | * | 2/2001 | Forster et al. | 137/493.8 |

* cited by examiner

*Primary Examiner*—Pam Rodriguez  
(74) *Attorney, Agent, or Firm*—Wenderoth, Lind & Ponack, L.L.P.

(57) ABSTRACT

An air chamber (53) of a damping force adjusting mechanism (49) disposed in a hydraulic shock absorber (3) of a damping force adjusting type communicates with an air chamber (7) of an air spring through a tubular path (57). A free piston (51) is transferred in accordance with the pressure of the air chamber and a spool (46) is transferred to shift a damping force. The damping force presents a soft characteristic both on the extending side and on the retracting side in a usual status, presents a hard characteristic on the extending side and a soft characteristic on the retracting side when the pressure of the air chamber is high, and presents a soft characteristic on the extending side and a hard characteristic on the retracting side when the pressure of the air chamber (7) is low. The damping force can be obtained, which approximates the damping force control on the basis of a so-called sky-hook theory. Therefore, the air suspension apparatus can alleviate the input from the axle side and improve a riding comfort and stability in operability by controlling the vibration on the vehicle body side.

21 Claims, 5 Drawing Sheets

AIR SUSPENSION APPARATUS

CROSS REFERENCE TO RELATED APPLICATION

The entire disclosure of Japanese Patent Application No. 11-92,715, filed on Mar. 31, 1999, including specification, claims and drawings is incorporated by reference in its entirety.

BACKGROUND OF THE INVENTION

The present invention relates to an air suspension apparatus so adapted as to improve a riding comfort and stability in operability by appropriately adjusting a damping force of a hydraulic shock absorber in accordance with the running status of the vehicle.

As a suspension apparatus of a vehicle such as an automobile, etc., there is known a so-called semi-active suspension apparatus that is so adapted as to control the posture of the vehicle at a real time with a controller by appropriately adjusting a damping force of a hydraulic shock absorber of a damping force adjusting type in accordance with the status of the vehicle on the basis of information from a vehicle acceleration sensor, a vehicle height sensor and the like. Such a semi-active suspension apparatus can improve a riding comfort and stability in operability as it can alleviate the input due to roughness on a road surface and control a variation in the posture of the vehicle while maintaining the vehicle always at a flat posture.

This conventional semi-active suspension apparatus, however, has the drawbacks that its structure becomes complicated, whereby manufacturing cost for vehicles are increased and the vehicle body becomes heavy because it requires a variety of sensors for use in detecting the status of the vehicle, including an acceleration sensor, a vehicle height sensor, etc., an actuator for shifting a damping force of a hydraulic shock absorber of a damping force adjusting type, and a controller for electronically controlling the operation of the actuator on the basis of information from the variety of the sensors. It further requires wiring for connection of these electronic devices.

SUMMARY OF THE INVENTION

The present invention has the object to provide an air suspension apparatus that can readily control the status of a vehicle by appropriately adjusting a damping force of a hydraulic shock absorber in accordance with the status of the vehicle and that has a simplified structure.

One of the features for the air suspension apparatus according to the present invention resides in that it has an air chamber acting as a spring element and a hydraulic shock absorber of a damping force adjusting type capable of adjusting a damping force characteristic by transmitting the pressure of the air chamber and selecting different damping force characteristic on its extending side (i.e. during an extending motion of the hydraulic shock absorber) and on its retracting side (i.e. during a retraction motion of the hydraulic shock absorber), wherein the damping force characteristic of the hydraulic shock absorber presents a hard characteristic on the extending side and a soft characteristic on the retracting side when the pressure in the air chamber is high, while it presents a soft characteristic on the extending side and a hard characteristic on the retracting side when the pressure in the air chamber is low.

With the configuration as described above, the air suspension apparatus according to the present invention can alleviate the input from the axle side (vehicle wheel side) of the air suspension and control a vibration on the vehicle body side of the air suspension by contracting the air chamber acting as a spring element and applying pressure thereto so as to let the damping force characteristic of the hydraulic shock absorber of a damping force adjusting type present a hard characteristic on the extending side and a soft characteristic on the retracting side when the hydraulic shock absorber is retracted from its ordinary status, and by expanding the air chamber and reducing the pressure therein so as to let changing the damping force characteristic thereof present a soft characteristic on the extending side and a hard characteristic on the retracting side when the hydraulic shock absorber is extended from its ordinary status.

Another feature of the air suspension apparatus according to the present invention resides in that, when the pressure in the air chamber for the air suspension apparatus is between the high pressure and the low pressure of the air chamber, the damping force feature of the hydraulic shock absorber of a damping force adjusting type presents a soft characteristic on both of the extending side and the retracting side.

With the configuration as described above, the damping force characteristic for the input of a high-frequency vibration from the axle side of the air suspension presents a soft characteristic both on the extending side and on the retracting side so that the high-frequency vibration from the axle side of the air suspension can be absorbed.

A further feature of the air suspension apparatus according to the present invention resides in that a delay element for delaying the transmission of pressure of the air chamber is mounted in a tubular path transmitting the pressure in the air chamber to the hydraulic shock absorber of a damping force adjusting type.

This configuration of the delay element can provide an appropriate damping force characteristic so that a phase of a variation in pressure to be transmitted from the air chamber to the hydraulic shock absorber can be delayed.

A still further feature of the air suspension apparatus according to the present invention resides in that the delay element is adapted to adjust a phase delay of the variation in pressure to be transmitted via the tubular path in accordance with a frequency of the vibration on the vehicle body side of the air suspension apparatus.

With this configuration as described above, an appropriate damping force characteristic can be achieved by adjusting the phase delay of the variation in pressure to be transmitted via the tubular path in accordance with the frequency of the vibration on the vehicle body side.

A still further feature of the air suspension apparatus according to the present invention resides in that the air suspension apparatus comprises a cylinder with oil liquid (i.e. a hydraulic fluid) filled therein, a piston disposed movably in the cylinder, a piston rod connected to the piston, a passageway through which is allowed to flow the oil liquid by the movement of the piston, a damping force generating mechanism for generating a damping force by controlling the flow of the oil liquid by the association of the movement of the piston, an air chamber so arranged as to vary the inner pressure thereof due to the movement of the piston, and a damping force adjusting mechanism disposed integrally with the damping force generating mechanism and arranged so as to adjust the damping force generated by the damping force generating mechanism upon transmission of the pressure of the air chamber.

This configuration of the air suspension apparatus according to the present invention can provide different damping force characteristics on the extending side and on the retracting side by associated operation of the damping force generating mechanism and the damping force adjusting mechanism. At the same time, it can absorb the high-frequency vibration from the axle side of the air suspension when the pressure in the air chamber is between a higher status and a lower status as the damping force characteristic of the hydraulic shock absorber of a damping force adjusting type presents a soft characteristic both on the extending side and on the retracting side so that the damping force characteristic for the input of the high-frequency vibration from the axle side of the air suspension presents a soft characteristic both on the extending side and on the retracting side.

A further feature of the air suspension apparatus according to the present invention resides in that the air suspension apparatus comprises a cylinder with oil liquid filled therein, a piston disposed movably in the cylinder, a piston rod connected to the piston, a passageway through which is allowed to flow the oil liquid in association with the movement of the piston, a damping force generating mechanism for generating a damping force by controlling the flow of the oil liquid by the associated movement of the piston, an air chamber so arranged as to vary the inner pressure thereof due to the movement of the piston, a damping force adjusting mechanism disposed integrally with the damping force generating mechanism and arranged so as to adjust the damping force generated by the damping force generating mechanism upon transmission of the pressure of the air chamber, and a delay element disposed in the damping force adjusting mechanism so as to delay the transmission of the pressure of the air chamber.

With this configuration, the air suspension apparatus of the present invention can provide different damping force characteristics on the extending side and on the retracting side by the operation of the damping force generating mechanism in associated with the damping force adjusting mechanism, and delay a phase of the variation in the pressure to be transmitted to the hydraulic shock absorber of a damping force adjusting type from the air chamber, so that appropriate damping force features can be realized.

Another feature of the air suspension apparatus according to the present invention resides in that the air suspension apparatus comprises a cylinder with oil liquid filled therein, a piston disposed movably in the cylinder, a piston rod connected to the piston, a passageway through which is allowed to pass the oil liquid by the movement of the piston, a damping force generating mechanism for generating a damping force by controlling the passage of the oil liquid by the movement of the piston, an air chamber so arranged as to vary the inner pressure thereof due to the movement of the piston, a damping force adjusting mechanism disposed integrally with the damping force generating mechanism and arranged so as to adjust the damping force generating mechanism upon transmission of the pressure of the air chamber, and a phase adjusting mechanism for delaying the transmission of the pressure of the chamber, which is disposed in the tubular path for transmitting the pressure of the air chamber into the damping force adjusting mechanism so as to adjust a phase delay of the variation in pressure to be transmitted via the tubular path in accordance with a frequency of the vibrations on the vehicle body side of the air suspension apparatus.

This configuration of the air suspension apparatus according to the present invention can provide different damping force characteristics on the extending side and on the retracting side by the operation of the damping force generating mechanism in association with the damping force adjusting mechanism, and delay a phase of the variation in the damping force characteristics with respect to a variation in pressure of the air chamber when the frequency of the vibration on the vehicle body side of the air suspension apparatus is low, while adjusting the change of the damping force characteristic so as to reach the phase on level with the change of the pressure in the air chamber when the frequency of the vibration on the vehicle body side thereof is high.

BRIEF DESCRIPTION OF THE DRAWINGS

The above and other objects, features and advantages of the present invention will be apparent from the following detailed description of the embodiments thereof, reference being made to the accompanying drawings, in which.

DESCRIPTION OF THE PREFERRED EMBODIMENTS

The present invention will be described in more detail by way of specific embodiments with reference to the accompanying drawings.

A description will be given below regarding the first embodiment of the air suspension apparatus with reference to FIGS. 1, 2 and 6.

Figure 1:
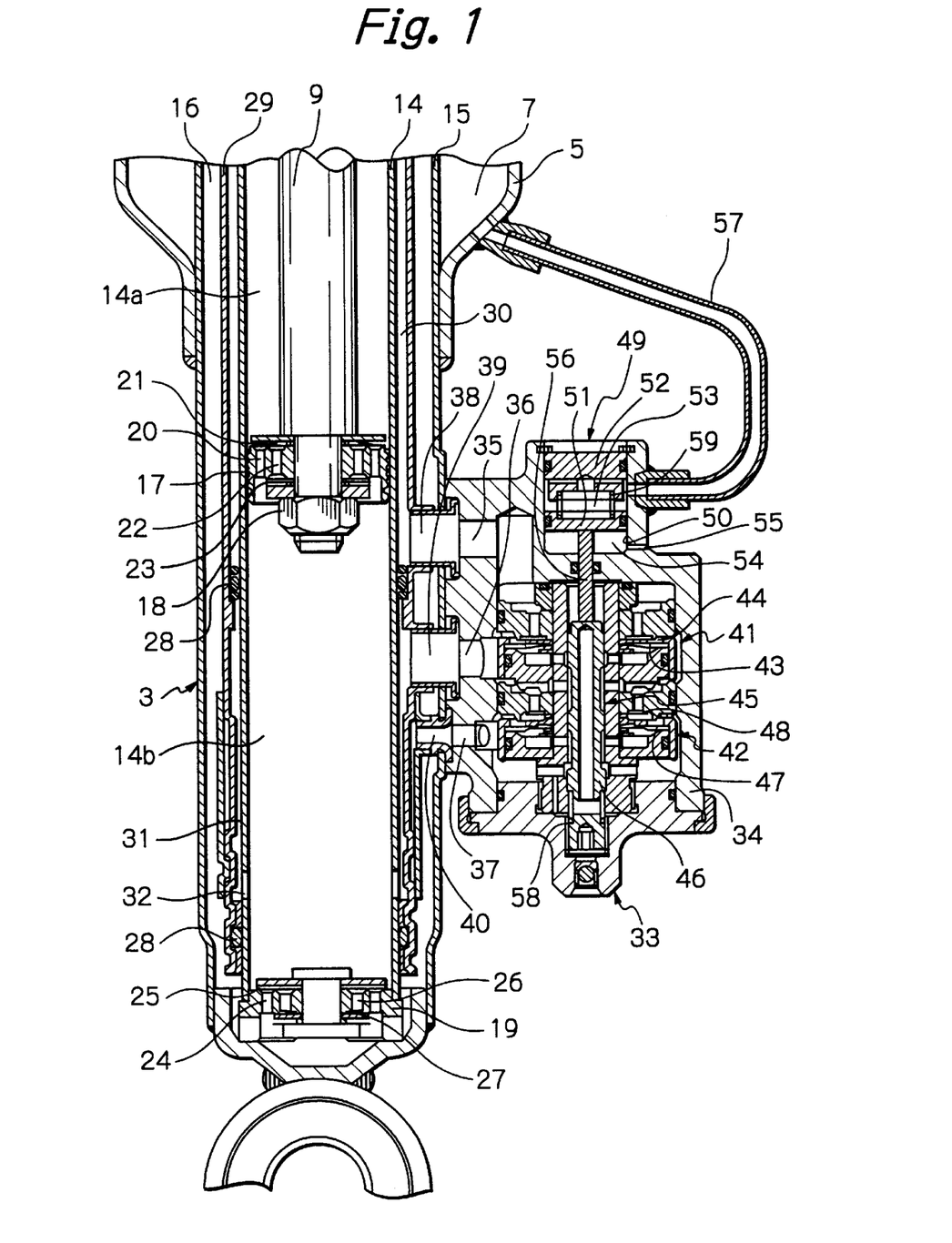
FIG. 1 is a longitudinal sectional view showing an essential portion of a hydraulic shock absorber of an air suspension apparatus in accordance with a first embodiment of the present invention.
Figure 2:
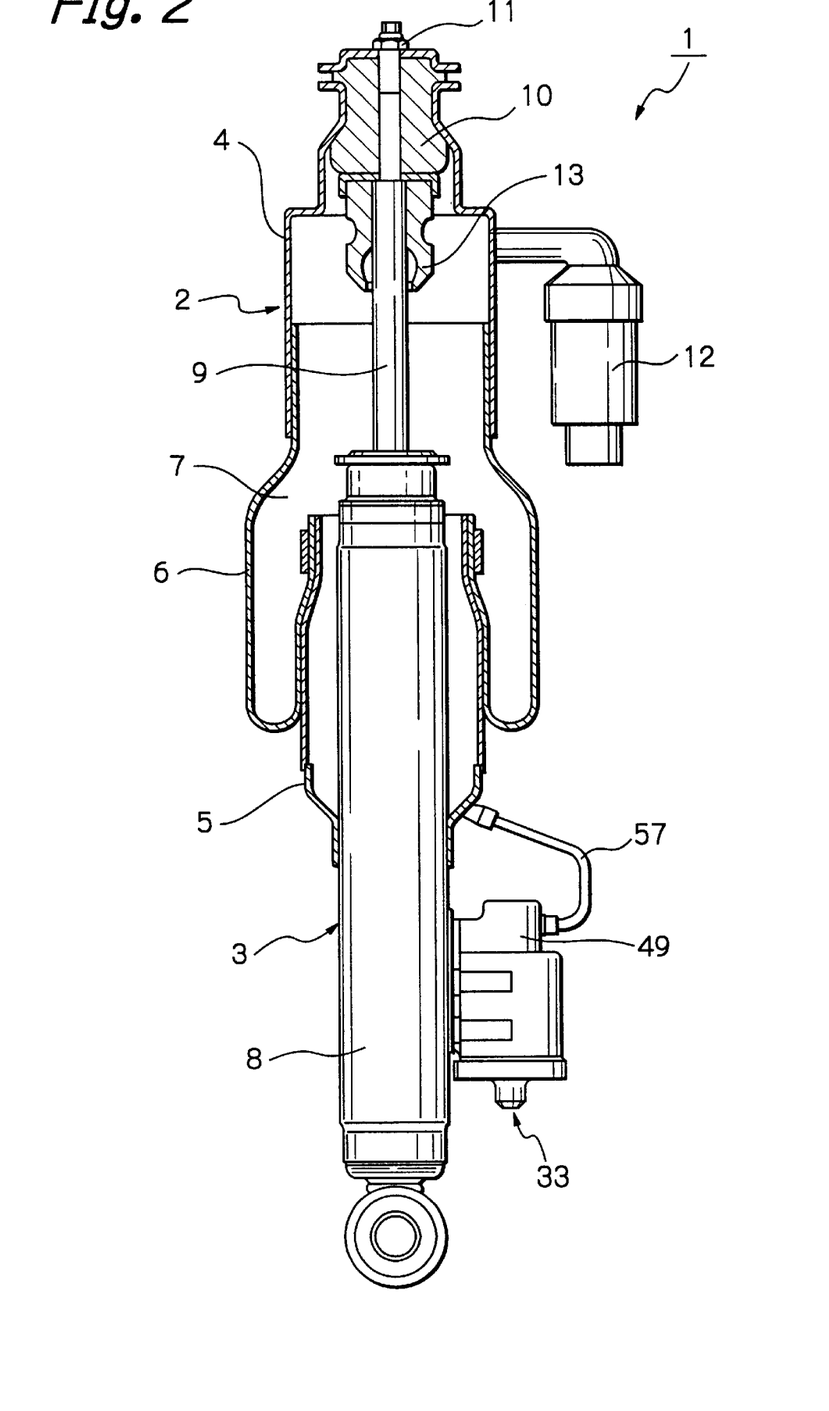
FIG. 2 is a side view showing a section of an air spring of the air suspension apparatus of FIG. 1.

As shown in FIGS. 1 and 2, an air suspension apparatus 1 in accordance with the first embodiment of the present invention comprises an air spring 2 acting as a spring element, and a hydraulic shock absorber 3 of a damping force adjusting type acting as a damping element (hereinafter referred to also as "the hydraulic shock absorber 3").

The air spring 2 is of a structure comprising an upper canister 4 and a lower canister 5 in a generally cylindrical form with a bottom, the upper and lower canisters being connected together airtightly by means of a generally cylindrical rubber tube 6 with its lower portion folded into the lower canisters 5 so as to form an air chamber 7 within the rubber tube. To a bottom portion of the lower canister 5 is welded a cylinder body 8 of the hydraulic shock absorber 3 in such a manner that an upper portion of the cylinder body is inserted airtightly into the lower canister. A piston rod 9 extending from the cylinder body 8 projects upwardly over the entire length of the air chamber 7 and it is connected to a bottom portion of the upper canister 4 with a nut 11 through a rubber bush 10. On the upper canister 4 is mounted a connection opening 12 through which the air chamber 7 is supplied with pressurized air. A rubber stop 13 is mounted on a lower portion of the rubber bush 10.

As shown in FIG. 1, the hydraulic shock absorber 3 is of a double tubular structure in which a cylinder 14 is disposed inside an outer tube 15, in which a reservoir 16 is formed between the cylinder 14 and the outer tube 15. The cylinder 14 has a piston 17 disposed therein so as to be slidable, and the piston 17 defines the cylinder 14 as an upper cylinder chamber 14a and a lower cylinder chamber 14b. One end of the piston rod 9 is connected to the piston 17 with a nut 18 and the other end of the piston rod extends outside the cylinder 14 over the entire length of the upper cylinder chamber 14a as well as a rod guide (not shown) and an oil seal (not shown) mounted on the cylinder 14 and an upper end portion of the outer tube 15. On the lower end portion of the cylinder 14 is mounted a base valve 19 that defines the lower cylinder chamber 14b and the reservoir 16. The cylinder 14 has oil liquid (i.e. hydraulic fluid) filed therein and the reservoir 16 has oil liquid and gases filled therein.

The piston 17 is provided with an oil path 20 and a check valve 21. The oil path 20 allows communication between the upper cylinder chamber 14a and the lower cylinder chamber 14b an the check valve 21 allows only a passage of the oil liquid through the oil path 20 from the lower cylinder chamber 14b to the upper cylinder chamber 14a. Furthermore, the piston 17 is provided with an oil path 22 and a disk valve 23, which can release the oil liquid of the upper cylinder chamber 14a to the lower cylinder chamber 14b as the pressure in the upper cylinder chamber 14a reaches a predetermined level. The base valve 19 is provided with an oil path 24 communicating the lower cylinder chamber 14b with the reservoir 16 and a check valve 25 that allows only a passage of the oil liquid through the oil path 24 from the reservoir 16 to the lower cylinder chamber 14b. Furthermore, the base valve 19 is provided with an oil path 26 and a disk valve 27, which can release the oil liquid of the lower cylinder chamber 14b to the reservoir 16 as the pressure in the lower cylinder chamber 14b reaches a predetermined level.

The cylinder 14 is enveloped with a cylindrical tube 29 through three sealing members 28 (with only two depicted in the figure). Upper and lower annular oil paths 30 and 31 are formed between the cylinder 14 and the tube 29. The upper annular oil path 30 is formed in communication with the upper cylinder chamber 14a through an oil path (not shown) disposed in a side wall of the cylinder 14 around the upper end portion of the cylinder 14, while the lower annular oil path 31 is formed in communication with the lower cylinder chamber 14b through an oil path 32 disposed in a side wall around the lower the side portion thereof. On the side portion of the outer tube 15 is mounted a damping force generating mechanism 33 that in turn is provided with three ports 35, 36 and 37 on a casing 34 thereof, which respectively communicate with the annular oil paths 30, 31 and the reservoir 16 through connecting tubes 38, 39 and 40.

The damping force generating mechanism 33 is provided with a damping valve 41 for the extension of the hydraulic shock absorber and a damping valve 42 for the retraction of the hydraulic shock absorber inside its casing 34, the damping valve 41 being formed so as to generate a damping force by controlling the flow of the oil liquid between the oil ports 35 and 36 and the damping valve 42 being formed so as to generate a damping force by controlling the flow of the oil liquid between the oil ports 36 and 37. The damping valve 41 comprises a main valve 43 acting as a pilot-type pressure control valve, a sub-valve 44 as a pressure control valve, and a spool valve 45 as a variable flow rate control valve. The main valve 43 is provided with a fixed orifice (not shown) that always communicates between an upstream side of the main valve 43 and the spool valve 45. This configuration of the main valve 43 can directly adjust an orifice characteristic (the damping force therefor being approximately proportional to the piston speed) by varying a flow path area extending between the oil ports 35 and 36 by transferring a spool 46 of the spool valve 45, and can adjust a valve characteristics (the damping force therefor being approximately proportional to the piston speed) by changing a pilot pressure of the main valve 43 due to the transferal of the spool and varying a valve-opening pressure of the main valve. On the other hand, the sub-valve 44 is disposed so as to optimize a damping force characteristic, in addition to the valve characteristic, in a low speed region of the piston speed, that is, in an orifice characteristic region.

The damping valve 42 likewise comprises a main valve 47 acting as a pilot-type pressure control valve, a sub-valve 48 as a pressure control valve, and the spool valve 45 for use in common with the damping valve 41. The main valve 47 is provided with a fixed orifice (not shown) that always communicates between an upstream side of the main valve 47 and the spool valve 45. Likewise with the damping valve 41, this configuration of the main valve 47 can directly adjust an orifice characteristic by varying a flow path area extending between the oil ports 36 and 37 by transferring the spool 46 of the spool valve 45 and can adjust a valve characteristic by changing a pilot pressure of the main valve 47 due to the transferal of the spool and varying a valve-opening pressure of the main valve. On the other hand, the sub-valve 48 is disposed so as to optimize the damping force characteristic, in addition to the valve characteristic, in a low speed region of the piston speed, that is, in an orifice characteristic region.

The spool valve 45 for use in common with the damping valves 41 and 42 for the respective extension and retraction of the hydraulic shock absorber is provided with the ports and lands so as to narrow a flow path area between the ports 35 and 36 and expand a flow path area between the ports 36 and 37, that is, so arranged as to adjust the damping force of the damping valve 41 toward a hard side and the damping force of the damping valve 42 toward a soft side when the spool 46 is transferred downwardly in the drawing, and so as to expand the flow path area between the ports 35 and 36 and narrow the flow path area between the ports 36 and 37, that is, so arranged as to adjust the damping force of the damping valve 41 toward a soft side and the damping force of the damping valve 42 toward a hard side when the spool 46 is transferred upwardly in the drawing. Further, when the spool 46 is located between the above positions, each of the ports and lands is disposed such that the flow path areas between the ports 35 and 36 and the ports 36 and 37 are both expanded, that is, they are disposed so as to adjust the damping force of the damping valves 41 and 42 toward both the soft side.

The casing 34 is provided with a damping force adjusting mechanism 49 at its upper end portion, which in turn has a cylinder bore 50 formed coaxially with the spool valve 45, the cylinder bore having a free piston 51 mounted slidably therein and having a plug 52 mounted at its opening portion to form a pressure chamber 53 between the free piston 51 and the plug 52. A drain chamber 54 is provided between the free piston 51 and a bottom portion of the cylinder bore 50 and opens to the ambient atmosphere through a vent hole 55. A rod 56 is inserted slidably and airtightly over the entire thickness of a partition wall of the casing 34 located on the side of the spool valve 45 and on the side of the damping force adjusting mechanism 49. One end of the rod 56 extends to and abuts with one end portion of the spool 46, and the other end thereof extends to and abuts with one end portion of the free piston 51. The air chamber 53 is disposed in communication with the air chamber 7 of the air spring 2 through a tubular path 57. A spring 58 is interposed between the end portion of the spool 46 and the casing 34, and a spring 59 is interposed between the free piston 51 and the plug 52. The spool 46 is typically disposed so a to hold its middle position that can adjust the damping force of the damping valves 41 and 42 toward the soft side by means of the pressure introduced into the air chamber 53 from the air chamber 7 through the tubular path 57 and the spring force of the springs 58 and 59.

A description will be given below regarding the action of the air suspension apparatus according to the embodiments of the present invention having the configuration as described above.

The air suspension apparatus 1 is installed in the position interposed between the vehicle body side and the vehicle wheel side of a suspension of a vehicle and supports the vehicle body by means of a compressed air filled in the air chamber 7 of the air spring 2, while applying the damping force to the upward or downward movement of the vehicle body and the wheels by extending or contracting the piston rod 9 of the hydraulic shock absorber 3. It is appreciated that the air suspension apparatus 1 can also be used in combination with a spring element of another suspension apparatus.

The hydraulic shock absorber 3 is configured such that pressure is applied to the oil liquid on the side of the upper cylinder chamber 14a by closing the check valve 21 of the piston 17 upon the movement of the piston 17 during the extension stroke of the piston rod 9, and the pressurized oil liquid is flown to the port 35 of the damping force generating mechanism 33 through the annular oil path 30 and the connecting tube 38. Then, the oil liquid flows from the port 35 through the sub-valve 44, the fixed orifice of the main valve 43 and the spool valve 45 to the port 36, further flowing through the connecting tube 39, the annular oil path 31 and the oil path 32 to the lower cylinder chamber 14b. As the oil liquid arrives at the lower cylinder chamber 14b and the pressure on the side of the upper cylinder chamber 14a reaches the valve-opening pressure of the main valve 43, the main valve 43 is opened and the oil liquid is then allowed to flow directly to the port 36 from the sub-valve 44. On the other hand, a portion of the oil liquid that amounts to the space formed upon evacuation of the piston rod 9 from the inside of the cylinder 14 opens the check valve 25 of the base valve 19 and flows into the lower cylinder chamber 14b from the reservoir 16.

Therefore, at the time of the extension stroke, the damping force having the orifice characteristic is allowed to occur in accordance with the flow path area of the spool valve 45 when the piston speed is low and before the main valve 43 is opened, while the damping force of the valve characteristic is allowed to occur in accordance with the extent to which the main valve 43 is open when the piston speed is high and the pressure on the side of the upper cylinder chamber 14a is raised, whereby the main valve 43 is opened. Then, the orifice characteristic can be directly adjusted by adjusting the flow path area of the spool valve 45 by transferring the spool 46, and the valve characteristic can be adjusted by varying the pilot pressure of the main valve 43.

On the other hand, at the time of the retraction stroke of the piston rod 9, as the piston 17 travels, the check valve 21 of the piston 17 is opened to allow the oil liquid of the lower cylinder chamber 14b to flow directly into the upper cylinder chamber 14a via the oil path 20, thereby bringing the pressure in the upper cylinder chamber 14a approximately on level with the pressure in the lower cylinder chamber 14b. Therefore, no oil liquid is caused to flow between the ports 35 and 36 of the damping force generating mechanism 33. On the other hand, as the check valve 25 of the base valve 19 is closed upon entry of piston rod 9 into the cylinder 14, the oil liquid within the cylinder 14 corresponding to a portion formed by the entry of the piston rod 9 is pressurized and flows from the lower cylinder chamber 14b through the oil path 32, the annular oil path 31 and the connecting tube 39 to the port 36 of the damping force generating mechanism 33, then continues flowing from the port 36 through the sub-valve 48, the fixed orifice of the main valve 47 and the spool valve 45 to the port 37. Then, the oil liquid flows from the port 37 through the connecting tube 40 to the reservoir 16. As the pressure within the cylinder 14 reaches the valve-opening pressure of the main valve 47, the main valve 47 is opened to flow the oil liquid from the sub-valve 48 directly to the port 37.

Therefore, at the time of the retraction stroke, the damping force having the orifice characteristic is generated in accordance with the flow path area of the spool valve 45 when the piston speed is low and before the main valve 47 is opened. As the piston speed becomes greater, the pressure within the cylinder 14 is caused to rise and the main valve 47 is opened to generate the damping force of the valve characteristic in accordance with the opening of the main valve 47. Then, the orifice characteristic can be directly adjusted by adjusting the flow path area of the spool valve 45 upon transferal of the spool 46, while the valve characteristic can be adjusted by varying the pilot pressure of the main valve 47.

As a vehicle with the air suspension apparatus 1 installed therein is in an ordinarily running status, the spool 46 of the damping force generating mechanism 33 is located in a middle position at which the damping valves 41 and 42 are adjusted both toward a soft side. Therefore, the damping force characteristics of the hydraulic shock absorber 3 on the extending and retracting sides are both in a soft side. This can absorb a vibration (a high-frequency vibration causing little variation in pressure within the air chamber 7) due to a small degree of irregularity on a road surface, thereby providing a favorable riding comfort.

As the air spring 2 is contracted from the ordinary status, that is, as the piston rod 9 of the hydraulic shock absorber 3 is retracted, when the vibration is applied to the vehicle body due to irregularity on a road surface, the pressure in the air chamber 7 is caused to rise, thereby introducing pressurized gas into the pressure chamber 53 of the damping force adjusting mechanism 49 via the tubular path 57 to allow the free piston 51 to transfer the spool 46 through the rod 56 downwardly in the drawing. This can adjust the damping valve 41 for the extension of the hydraulic shock absorber toward a hard side and the damping valve 42 of the retraction of the hydraulic shock absorber toward a soft side in accordance with the pressure of the air chamber 7, so that the damping force characteristics on the extending side and on the retracting side of the hydraulic shock absorber 3 present a hard side and a soft side, respectively.

On the other hand, as the air spring 2 is expanded from the ordinary status, that is, as the piston rod 9 of the hydraulic shock absorber 3 is extended, the pressure of the air chamber 7 is caused to be lowered, thereby reducing the pressure in the pressure chamber 53 of the damping force adjusting mechanism 49 via the tubular path 57 and transferring the free piston 51 in a upward direction to move the spool 46 upwardly as shown in the drawing. This can adjust the damping valve 41 toward a soft side and the damping valve 42 toward a hard side in accordance with the pressure in the air chamber, so that the damping force characteristics on the extending and retracting sides of the hydraulic shock absorber 3 present a soft side and a hard side, respectively.

Figure 6:
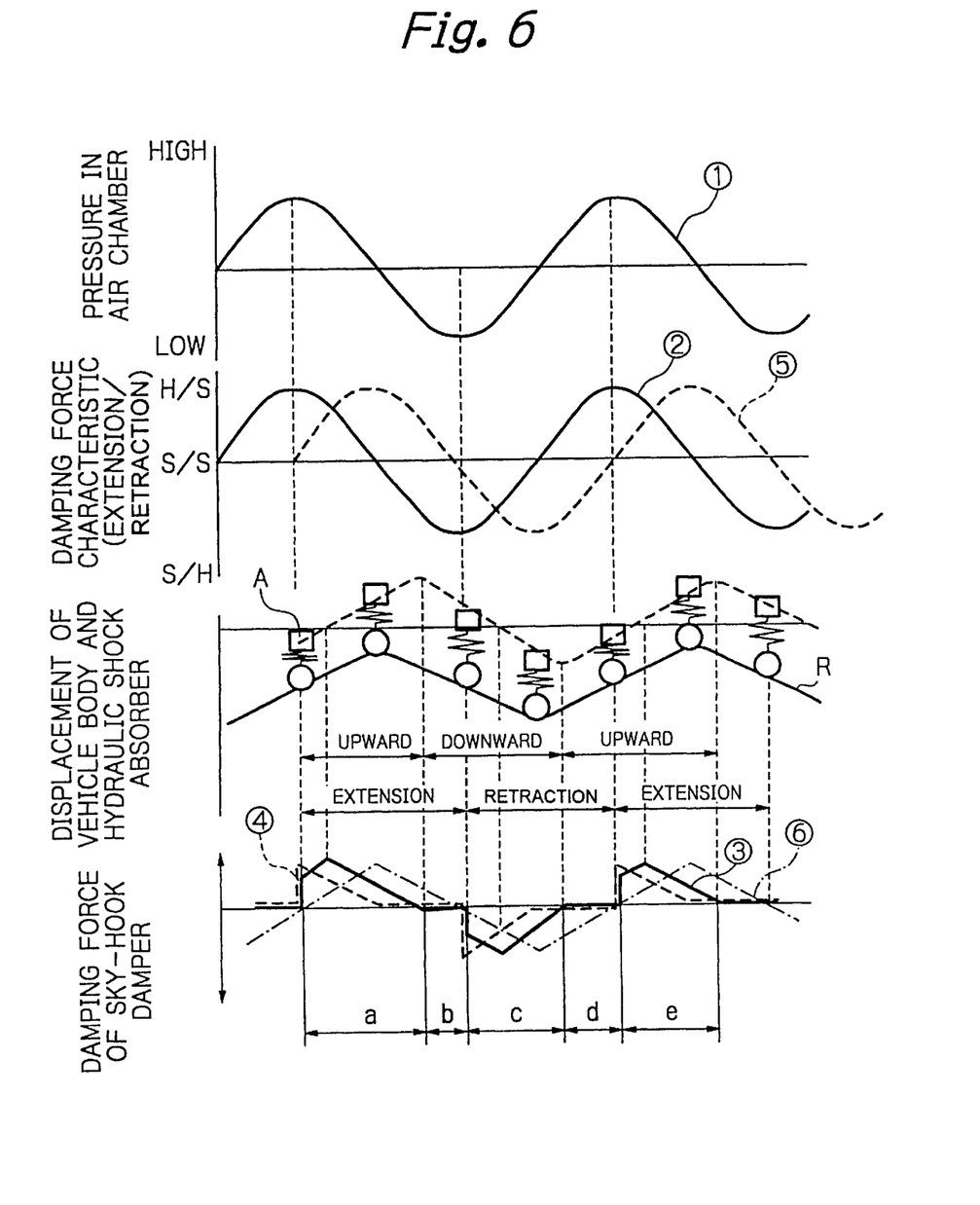
FIG. 6 is a diagram showing damping force features of the air pressure suspension apparatuses depicted in FIGS. 1 to 3.

For instance, as shown in FIG. 6, when the vehicle A runs on a curved road surface R, the above-described configuration of the air suspension apparatus changes the pressure in the air chamber 7 of the air spring 2 with respect to a displacement of the vehicle body and the hydraulic shock absorber 3, as shown as line (1), and this allows a continuous adjustment of the damping force characteristics on the extending and retracting sides of the hydraulic shock absorber 3, as shown as line (2). In FIG. 6, reference symbols "H" and "S" denote soft and hard characteristics, respectively.

On the other hand, the control over the semi-active damper on the basis of a so-called sky-hook theory can control the upward and downward vibrations of the vehicle body and improve a riding comfort and stability in operability by means of adjustments as indicated in line (3), in such a manner that the vibrations of the vehicle body controlled by increasing the damping force of the hydraulic shock absorber in accordance with the speed in the upward or downward direction of the vehicle body in a region a (vehicle body: upward; hydraulic shock absorber: extending), a region c (vehicle body: downward; hydraulic shock absorber: retracting) and a region e (vehicle body: upward; hydraulic shock absorber: extending), where the motion directions on the vehicle body side and the axle side of the air suspension are the same from displacement of the vehicle body and the hydraulic shock absorber (in a state where vibration is controlled), and in such a manner that the input of the vibration from the axle side is absorbed by lowering the damping force of the hydraulic shock absorber in region b (vehicle body: downward; hydraulic shock absorber extending) and a region d (vehicle body: upward; hydraulic shock absorber: retracting), where the motion directions on the vehicle body side and the axle side are each different (in a status where vibration is applied).

On the other hand, the air suspension apparatus according to the present invention is configured such that the damping force generated actually by the hydraulic shock absorber 3 in accordance with its extension and retraction is adjusted in a manner as indicated in line (4) of FIG. 6, as is approximate to the line (3) obtained on the basis of the sky-hook theory as described above. Therefore, the air suspension apparatus can appropriately control the damping force characteristic of the hydraulic shock absorber without using any sensor, actuator, controller and wiring for connecting those electronic devices and parts, so that the upward and downward vibration of the vehicle body can be alleviated and a riding comfort and stability in operability can be improved.

Figure 3:
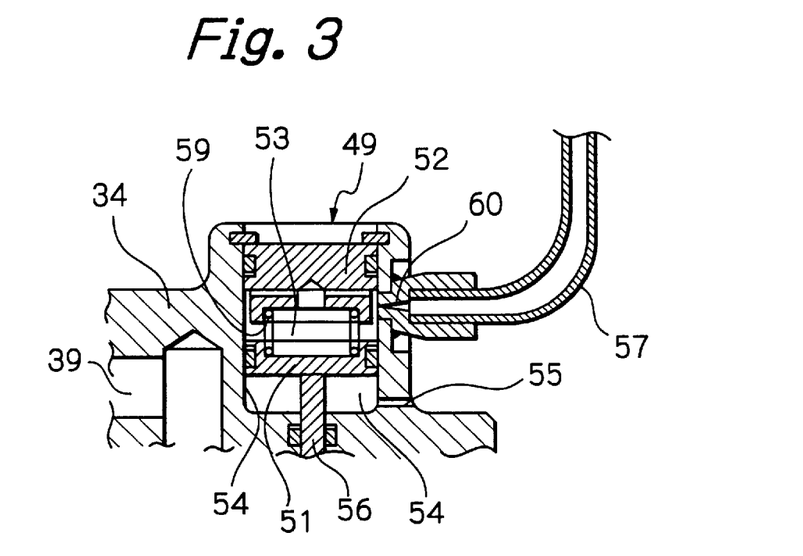
FIG. 3 is a longitudinal sectional view showing an enlarged view of a damping force adjusting mechanism as a variant of the air suspension apparatus of FIG. 1.

In a variant of the first embodiment of the air suspension apparatus according to the present invention, a throttle 60 may be disposed as a delay element for delaying the transmission of pressure to the tubular path 57 communicating the air chamber 7 with the pressure chamber 53, as shown in FIG. 3 for example. The throttle 60 can optionally delay a phase of the variation in pressure to be transmitted to the pressure chamber 53 from the air chamber 7, so that the variant of the first embodiment can delay a phase of the variation in the damping force characteristic of the hydraulic shock absorber 3, as compared with the first embodiment of the air suspension apparatus. As an example, the damping force characteristic of the hydraulic shock absorber 3 is shown as line (5) in FIG. 6, in the case where a phase of a variation in the damping force characteristic is delayed with the throttle 60 by 90 degrees with respect to the first embodiment. In this case, the damping force generated actually by the hydraulic shock absorber 3 in accordance with its extension and retraction can be shown as in line (6). This indicates that the provision of the delay element (e.g. throttle 60) in the tubular path 57 can adjust a phase of the variation in the damping force characteristic of the hydraulic shock absorber. By optionally adjusting the delay element, the phase of the variation in the damping force characteristic of the hydraulic shock absorber can approximate to the line (3) as indicated in FIG. 6, thereby enabling an appropriate control over the damping force. As the delay element, there may also be used an orifice, chamber or any other delay element, in addition to the throttle.

A description will be given below regarding the second embodiment of the air suspension apparatus according to the present invention with reference to FIGS. 4 and 5. The second embodiment of the air suspension apparatus has substantially the same configuration as the first embodiment, with the exception that a phase adjusting mechanism is disposed in the tubular path communicating the air chamber with the pressure chamber. The parts of the second embodiment identical to the first embodiment are provided with the identical reference numerals and a description of the identical parts will be omitted. The parts different from those identical parts will be described below in more detail.

Figure 5:
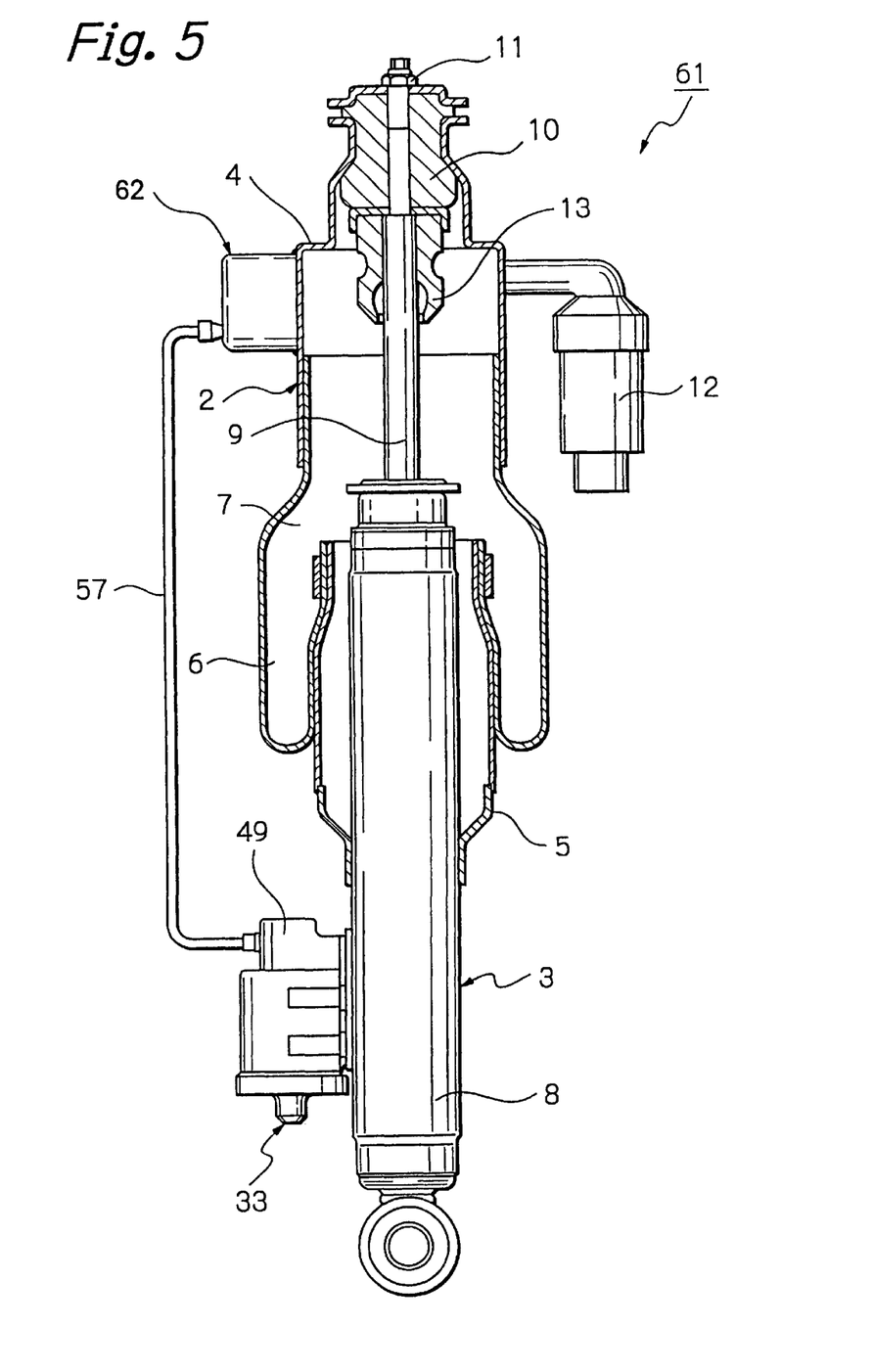
FIG. 5 is a side view showing a section of an air spring of the air suspension apparatus of FIG. 4.

FIG. 5 shows an air suspension apparatus 61 in accordance with the second embodiment of the present invention, which has a phase adjusting mechanism 62 (a delay element) mounted on the upper canister 4 of the air spring 2 connected to the vehicle body side and a tubular path 57 connected to the air chamber 7 through the phase adjusting mechanism 62.

Figure 4:
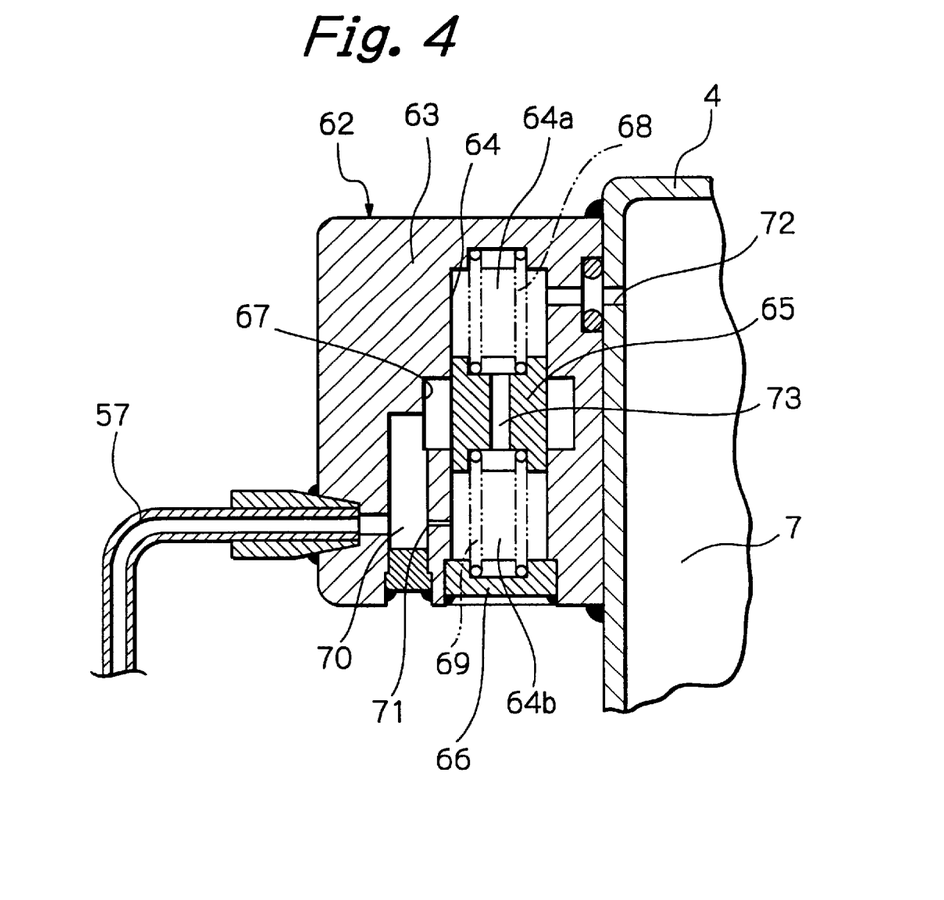
FIG. 4 is a longitudinal sectional view showing an enlarged view of a phase adjusting mechanism of an air suspension apparatus in accordance with a second embodiment of the present invention.

As shown in FIG. 4, the phase adjusting mechanism 62 has a free piston 65 (a weight) disposed slidably in a cylinder bore 64 formed in a casing 63 and extending vertically in the casing 63 and a plug 66 mounted on an opening portion of the cylinder bore 64. Furthermore, the cylinder bore 64 is divided with the free piston 65 into two chambers, i.e., a cylinder chamber 64a on the top side and a cylinder chamber 64b on the bottom side of the plug 66. At the axially middle portion of the cylinder bore 64 is formed an annular groove 67 having an axial length shorter than the free piston 65. A compressive spring 68 is interposed between the free piston 65 and the top portion of the cylinder bore 64, and a compressive spring 69 is interposed between the free piston 65 and the plug 66. The spring force of these springs holds the free piston 65 elastically at an axially middle position of the cylinder bore to allow the annular groove 67 to be blocked from cylinder chambers 64a and 64b.

The casing 63 is provided with a chamber 70 communicating with the annular groove 67 on the side portion of the cylinder bore 64. The chamber 70 also communicates with the cylinder chamber 64b through a throttle path 71 and is connected to one end portion of the tubular path 57. The tubular path 57 is made from a flexible hose or any other suitable tube as it connects the damping force adjusting mechanism 49 of the damping force generating mechanism 33 mounted on the cylinder body 8 (on the axle side) to the upper canister 4 (on the vehicle body side) of the air spring 2. The cylinder chamber 64a communicates with the air chamber 7 through a path 72 disposed in the side wall of the upper canister 4. The free piston 65 is provided with a communicating path 73 that communicates the cylinder chamber 64a with the cylinder chamber 64b.

Moreover, the mass of the free piston 65 and the spring force of the springs 68 and 69 are set so as for the resonant frequency of the free piston 65 to become higher (more than approximately 2 Hz) than the resonant frequency (approximately 1 Hz) of the vehicle body.

With the configuration as described above, the vehicle body is allowed to freely vibrate, in other words, the vehicle body side of the air suspension is allowed to freely vibrate without the input of the vibration from the axle side of the air suspension. If the frequency from the vehicle body is low, the free piston 65 moves together with the casing 63 and held at the middle portion of the cylinder bore 64 to block the annular groove 67 from the cylinder chambers 64a and 64b. Therefore, the air chamber 7 is allowed to communicate with the pressure chamber 53 via the path 72, cylinder chamber 64a, communicating path 73, cylinder chamber 64b, throttle path 71, chamber 70 and tubular path 57. With this configuration, a phase delay of a variation in the damping force characteristic of the hydraulic shock absorber 3 can be produced by the throttle path 71 with respect to a variation in pressure of the air chamber 7, as in the case shown in FIG. 3.

When vibration is produced in the vehicle body by means of the input from the axle side of the air suspension at a frequency higher than the resonant frequency on the vehicle body side, the free piston 65 moves relatively to the casing 63 and allows the annular groove 67 to communicate with the cylinder chambers 64a and 64b, so that the throttle path 71 is bypassed by the annular groove 67. This configuration can make a phase of the variation in the pressure of the air chamber 7 on level with a phase of the variation in the damping force characteristic of the hydraulic shock absorber 3, as in the case shown in FIG. 1.

As the phase of the variation in the damping force characteristic of the hydraulic shock absorber 3 with respect to the variation in the pressure of the air chamber 7 can be adjusted in accordance with the frequency of the upward and downward vibrations on the vehicle body in the manner as described above, the freedom of adjustment of the damping force characteristic can be extended, thereby achieving a more appropriate damping force characteristic.

As described above in detail, the air suspension apparatus according to the present invention is configured such that, when the hydraulic shock absorber of a damping force adjusting type is retracted from its ordinary status, on the one hand, the air chamber acting as a spring element is contracted and pressure is applied so that the damping force characteristic of the hydraulic shock absorber presents a hard characteristic on the extending side (i.e. during extension of the piston rod) and a soft characteristic on the retracting side (i.e. during retraction of the piston rod), and such that, when the hydraulic shock absorber is extended from its ordinary status, on the other hand, the air chamber is expanded and pressure is reduced so that the damping force characteristic of the hydraulic shock absorber presents a soft characteristic on the extending side and a hard characteristic on the retracting side. This configuration can alleviate the input from the axle side of the air suspension and control the vibration on the vehicle body side of the air suspension. As a consequence, the air suspension apparatus according to the present invention can appropriately control the damping force characteristic of the hydraulic shock absorber without using electronic devices and parts, including sensors, actuators, controllers, wiring for connecting these devices and parts, etc. Furthermore, it can control the upward and downward vibrations of the vehicle body to improve a riding comfort and stability in operability.

The air suspension apparatus according to another aspect of the present invention can absorb the high-frequency vibration from the axle side by turning the damping force characteristic to a soft characteristic both on the extending and retracting sides with respect to the input of the high-frequency vibration, so that a riding comfort and stability in operability can be improved.

The air suspension apparatus according to a further aspect of the present invention can delay a phase of the variation in pressure to be transmitted to the hydraulic shock absorber of a damping force adjusting type from the air chamber and achieve an appropriate damping force characteristic.

The air suspension apparatus according to a still further aspect of the present invention can adjust a phase delay of the variation in pressure to be transmitted via the tubular path in accordance with the frequency of the vibration on the vehicle body side and achieve an appropriate damping force characteristic.

Although the present invention has been described by way of the preferred embodiments, it is to be understood that the present invention cannot be restricted to those embodiments and it is construed to those skilled in the art as encompassing a variety of modifications without departing from the spirit and scope of the invention. It is further to be understood that the present invention is construed as being restricted only by the description of the appended claims.

What is claimed is:

1. An air suspension apparatus comprising:

an air chamber that is to act as a spring element; and a hydraulic shock absorber to adjust a damping force characteristic via transmission of pressure from said air chamber to said hydraulic shock absorber, with different damping force characteristics capable of being exhibited on an extending side and a retracting side of said hydraulic shock absorber such that (i) when the pressure in said air chamber is high, a hard damping force characteristic is exhibited on the extending side of said hydraulic shock absorber and a soft damping force characteristic is exhibited on the retracting side of said hydraulic shock absorber, (ii) when the pressure in said air chamber is low, a soft damping force characteristic is exhibited on the extending side of said hydraulic shock absorber and a hard damping force characteristic is exhibited on the retracting side of said hydraulic shock absorber, and (iii) when the pressure in said air chamber is between high and low, a soft damping force characteristic is exhibited on the extending side of said hydraulic shock absorber and a soft damping force characteristic is exhibited on the retracting side of said hydraulic shock absorber.

2. An air suspension apparatus comprising:

an air chamber that is to act as a spring element;

a hydraulic shock absorber to adjust a damping force characteristic via transmission of air pressure from said air chamber to said hydraulic shock absorber, with different damping force characteristics capable of being exhibited on an extending side and a retracting side of said hydraulic shock absorber such that (i) when the air pressure in said air chamber is high, a hard damping force characteristic is exhibited on the extending side of said hydraulic shock absorber and a soft damping force characteristic is exhibited on the retracting side of said hydraulic shock absorber, and (ii) when the air pressure in said air chamber is low, a soft damping force characteristic is exhibited on the extending side of said hydraulic shock absorber and a hard damping force characteristic is exhibited on the retracting side of said hydraulic shock absorber; and a delay element disposed within a path that interconnects said air chamber and said hydraulic shock absorber, wherein said delay element is to delay the transmission of the air pressure from said air chamber to said hydraulic shock absorber by limiting only air flow through said path.

3. The air suspension apparatus according to claim 2, wherein said delay element is also to adjust a delay of a phase of variation of pressure to be transmitted via said path in accordance with a frequency of vibration on a vehicle body side of said air suspension apparatus.

4. The air suspension apparatus according to claim 3, wherein the hydraulic shock absorber is to adjust a damping force characteristic via transmission of air pressure from said air chamber to said hydraulic shock absorber, with different damping force characteristics capable of being exhibited on an extending side and a retracting side of said hydraulic shock absorber such that further (iii) when the air pressure in said air chamber is between high and low, a soft damping force characteristic is exhibited on the extending side of said hydraulic shock absorber and a soft damping force characteristic is exhibited on the retracting side of said hydraulic shock absorber.

5. The air suspension apparatus according to claim 3, wherein said delay element is to adjust the delay of a phase of variation of air pressure to be transmitted via said path in accordance with a frequency of vibration on a vehicle body side of said air suspension apparatus by (i) producing a phase delay of a variation of the damping force characteristic with respect to a variation of the air pressure in said air chamber when the frequency of vibration on the vehicle body side of said air suspension apparatus is low, and (ii) equalizing in phase the variation of the air pressure in said air chamber to the variation of the damping force characteristic when the frequency of vibration on the vehicle body side of said air suspension apparatus is high.

6. An air suspension apparatus comprising:
a cylinder to contain hydraulic fluid therein;
a piston slidably disposed within said cylinder, with said piston having a piston rod extending therefrom;
a flow path through which the hydraulic fluid is to flow in response to sliding movement of said piston;
a damping force generating mechanism to generate a damping force by controlling the flow of the hydraulic fluid through said flow path;
an air chamber in which a pressure is to vary in response to said piston rod being extended and retracted; and
a damping force adjusting mechanism to adjust the damping force by transmitting the pressure in said air chamber,
whereby different damping force characteristics are to be provided during extension and retraction of said piston rod, respectively, by operation of said damping force generating mechanism in association with said damping force adjusting mechanism such that (i) when the pressure in said air chamber is high in response to said piston rod being at a retracted position, a hard damping force characteristic is exhibited during extension of said piston rod and a soft damping force characteristic is exhibited during retraction of said piston rod, (ii) when the pressure in said air chamber is low in response to said piston rod being at an extended position, a soft damping force characteristic is exhibited during extension of said piston rod and a hard damping force characteristic is exhibited during retraction of said piston rod, and (iii) when the pressure in said air chamber is between high and low in response to said piston rod being at an intermediate position between said retracted position and said extended position, a soft damping force characteristic is exhibited during extension of said piston rod and a soft damping force characteristic is exhibited during retraction of said piston rod.

7. The air suspension apparatus according to claim 6, wherein said damping force adjusting mechanism is integral with said damping force generating mechanism.

8. An air suspension apparatus comprising:
a cylinder to contain hydraulic fluid therein;
a piston slidably disposed within said cylinder, with said piston having a piston rod extending therefrom;
a flow path through which the hydraulic fluid is to flow in response to sliding movement of said piston;
a damping force generating mechanism to generate a damping force by controlling the flow of the hydraulic fluid through said flow path;
an air chamber in which a pressure is to vary in response to said piston rod being extended and retracted; and
a damping force adjusting mechanism to adjust the damping force by transmitting the pressure in said air chamber,
wherein said damping force adjusting mechanism includes a valve member that is to move in response to the pressure in said air chamber, and said damping force generating mechanism includes a spool for controlling the flow of said hydraulic fluid through said flow path, with said spool to move in response to movement of said valve member.

9. The air suspension apparatus according to claim 8, wherein said damping force adjusting mechanism is integral with said damping force generating mechanism.

10. An air suspension apparatus comprising:
a cylinder to contain hydraulic fluid therein;
a piston slidably disposed within said cylinder, with said piston having a piston rod extending therefrom;
a flow path through which the hydraulic fluid is to flow in response to movement of said piston;
a damping force generating mechanism to generate a damping force by controlling the flow of the hydraulic fluid through said flow path;
an air chamber in which air pressure is to vary in response to said piston rod being extended and retracted;
a damping force adjusting mechanism to adjust the damping force by transmitting the air pressure in said air chamber; and
a delay element to delay transmission of the air pressure in said air chamber by limiting air flow from said air chamber to said damping force adjusting mechanism.

11. The air suspension apparatus according to claim 10, wherein said damping force adjusting mechanism is integral with said damping force generating mechanism and said delay element is disposed in said damping force adjusting mechanism.

12. The air suspension apparatus according to claim 11, whereby different damping force characteristics are to be provided during extension and retraction of said piston rod, respectively, by operation of said damping force generating mechanism in association with said damping force adjusting mechanism such that
   (i) when the air pressure in said air chamber is high in response to said piston rod being at a retracted position, a hard damping force characteristic is exhibited during extension of said piston rod and a soft damping force characteristic is exhibited during retraction of said piston rod, and
   (ii) when the air pressure in said air chamber is low in response to said piston rod being at an extended position, a soft damping force characteristic is exhibited during extension of said piston rod and a hard damping force characteristic is exhibited during retraction of said piston rod.

13. The air suspension apparatus according to claim 12, whereby different damping force characteristics are to be provided during extension and retraction of said piston rod, respectively, by operation of said damping force generating mechanism in association with said damping force adjusting mechanism such that further
   (iii) when the air pressure in said air chamber is between high and low in response to said piston rod being at an intermediate position between said retracted position and said extended position, a soft damping force characteristic is exhibited during extension of said piston rod and a soft damping force characteristic is exhibited during retraction of said piston rod.

14. The air suspension apparatus according to claim 11, wherein said delay element comprises a throttle.

15. The air suspension apparatus according to claim 10, wherein said delay element is also to adjust a delay of a phase of variation of air pressure to be transmitted via said flow path in accordance with a frequency of vibration on a vehicle body side of said air suspension apparatus.

16. The air suspension apparatus according to claim 15, whereby different damping force characteristics are to be provided during extension and retraction of said piston rod, respectively, by operation of said damping force generating mechanism in association with said damping force adjusting mechanism such that
   (i) when the air pressure in said air chamber is high in response to said piston rod being at a retracted position, a hard damping force characteristic is exhibited during extension of said piston rod and a soft damping force characteristic is exhibited during retraction of said piston rod, and
   (ii) when the air pressure in said air chamber is low in response to said piston rod being at an extended position, a soft damping force characteristic is exhibited during extension of said piston rod and a hard damping force characteristic is exhibited during retraction of said piston rod.

17. The air suspension apparatus according to claim 16, whereby different damping force characteristics are to be provided during extension and retraction of said piston rod, respectively, by operation of said damping force generating mechanism in association with said damping force adjusting mechanism such that further
   (iii) when the air pressure in said air chamber is between high and low in response to said piston rod being at an intermediate position between said retracted position and said extended position, a soft damping force characteristic is exhibited during extension of said piston rod and a soft damping force characteristic is exhibited during retraction of said piston rod.

18. The air suspension apparatus according to claim 16, wherein said delay element is to adjust the delay of a phase of variation of air pressure to be transmitted via said flow path in accordance with a frequency of vibration on a vehicle body side of said air suspension apparatus by
   (i) producing a phase delay of a variation of the damping force characteristic with respect to a variation of the air pressure in said air chamber when the frequency of vibration on the vehicle body side of said air suspension apparatus is low, and
   (ii) equalizing in phase the variation of the air pressure in said air chamber to the variation of the damping force characteristic when the frequency of vibration on the vehicle body side of said air suspension apparatus is high.

19. The air suspension apparatus according to claim 15, wherein said delay element includes a casing having an inlet and an outlet, a casing flow path interconnecting said inlet and said outlet, an adjustment valve to block said casing flow path, with said adjustment valve being movably supported by a spring within said casing flow path, and a throttle path for by-passing said adjustment valve.

20. The air suspension apparatus according to claim 19, wherein a resonant frequency of said adjustment valve is to be higher than a resonant frequency on the vehicle body side of said air suspension apparatus.

21. The air suspension apparatus according to claim 20, wherein said delay element is to adjust the delay of a phase of variation of air pressure to be transmitted via said flow path in accordance with a frequency of vibration on a vehicle body side of said air suspension apparatus by
   (i) producing a phase delay of a variation of the damping force characteristic with respect to a variation of the air pressure in said air chamber by virtue of said throttle path when the frequency of vibration on the vehicle body side of said air suspension apparatus is low, and
   (ii) equalizing in phase the variation of the air pressure in said air chamber to the variation of the damping force characteristic by virtue of said adjustment valve when the frequency of vibration on the vehicle body side of said air suspension apparatus is high.

* * * * *